(12) United States Patent
Parry

(10) Patent No.: US 10,439,805 B1
(45) Date of Patent: Oct. 8, 2019

(54) PLATFORM FOR AUTOMATED RECORDING AND STORAGE OF MESSAGING SERVICE CONVERSATIONS

(71) Applicant: DeepView Solutions, London (GB)

(72) Inventor: Catherine Jessie Walker Parry, London (GB)

(73) Assignee: DeepView Solutions, London (GB)

( * ) Notice: Subject to any disclaimer, the term of this patent is extended or adjusted under 35 U.S.C. 154(b) by 0 days.

(21) Appl. No.: 16/383,225

(22) Filed: Apr. 12, 2019

(51) Int. Cl.
*H04L 9/08* (2006.01)
*H04L 12/58* (2006.01)
*G06F 3/06* (2006.01)
*H04L 29/08* (2006.01)

(52) U.S. Cl.
CPC .......... *H04L 9/0825* (2013.01); *G06F 3/0622* (2013.01); *G06F 3/0655* (2013.01); *G06F 3/0673* (2013.01); *H04L 51/04* (2013.01); *H04L 67/306* (2013.01)

(58) Field of Classification Search
CPC ...... H04L 9/0825; H04L 67/306; H04L 51/04; G06F 3/0655; G06F 3/0673; G06F 3/0622
See application file for complete search history.

(56) References Cited

U.S. PATENT DOCUMENTS

| | | | |
|---|---|---|---|
| 8,972,511 B2 | 3/2015 | Freire et al. | |
| 9,369,433 B1 | 6/2016 | Paul et al. | |
| 2013/0194301 A1* | 8/2013 | Robbins | G06F 21/60 345/629 |
| 2014/0229376 A1 | 8/2014 | Kaminsky et al. | |
| 2015/0095971 A1* | 4/2015 | Roffe | G06F 21/445 726/1 |
| 2019/0113973 A1* | 4/2019 | Coleman | G16H 40/67 |

* cited by examiner

*Primary Examiner* — Michael A Keller
(74) *Attorney, Agent, or Firm* — Brian R. Galvin; Galvin Patent Law, LLC

(57) ABSTRACT

A system for a system for automated recording and storage of encrypted messaging service conversations. The system enables access to unencrypted versions of a monitored user's encrypted messaging feeds, and allows for the recording, storage, indexing, cataloging, and searching thereof. The monitored user is able to select which conversations in the messaging feeds may be so accessed.

4 Claims, 9 Drawing Sheets

PLATFORM FOR AUTOMATED RECORDING AND STORAGE OF MESSAGING SERVICE CONVERSATIONS

CROSS-REFERENCE TO RELATED APPLICATIONS

None

BACKGROUND OF THE INVENTION

Field of the Invention

The disclosure relates to the field of communications and messaging, particularly for the purposes of recording conversations from messaging services to comply with established regulatory rules.

Discussion of the State of the Art

The rise in popularity of portable devices, and the increasing culture of sharing various aspects of one's life on social media and messaging has proven to be an evolving burden on adherence to regulatory rules. In the financial industry, for example, employers are required to record every work-related communication held by employees. This task is made difficult by the multiplicity of means through which conversations can be held, including particularly popular messaging services such as WhatsApp, currently the most popular messaging service. The task is made more difficult because WhatsApp and other messaging services now provide end-to-end encryption, meaning that messages can't be read even if they are recorded, unless the employee grants the employer access to the unencrypted messages from the messaging service account. Employees are reluctant to have all of their conversations (including personal conversations unrelated to work) on a messaging service recorded, but there is currently no way to select which conversations can be recorded by the employer, and which cannot.

What is needed to a system that allows employers to access and record an employee's unencrypted messages related to work on a messaging service, while allowing the employee control over which conversations can be recorded and which cannot.

SUMMARY OF THE INVENTION

Accordingly, the inventor has conceived, and reduced to practice, a system for automated recording and storage of messaging service conversations.

In a typical embodiment, a system is provided that enables access to unencrypted versions of a monitored user's encrypted messaging feeds, and allows for the recording, storage, indexing, cataloging, and searching thereof. The monitored user is able to select which conversations in the messaging feeds may be so accessed.

According to a preferred embodiment, a system for automated recording of conversations on messaging services is disclosed, comprising: a computer comprising a memory, at least one processor, and a plurality of programming instructions stored in the memory, the plurality of programming instructions when executed by the processor, cause the processor to: receive, from a monitored user device, a plurality of credentials, the credentials used to access a plurality of data in unencrypted form from at least one messaging service account associated to the monitored user device; generate an asymmetric encryption key for the monitored user device to ensure security of the plurality of data; retrieve a list of user profiles associated with the monitored user device, each user profile of the list corresponding to at least one conversation with the monitored user device provide the option to select from the list of user profiles which user profiles may be recorded; receive from the monitored device at least one user profile, of the list of user profiles, to be recorded and stored; periodically retrieve a plurality of conversation data from the at least one messaging service to record and store, the plurality of conversation data associated with the at least one user profile; and record and store the plurality of conversation data.

According to another preferred embodiment, a messaging service conversation recording computer is disclosed, comprising a memory, at least one processor, and a plurality of programming instructions stored in the memory, the plurality of programming instructions when executed by the processor, cause the processor to perform a method for automated recording of conversations on messaging services, comprising the steps of: receiving, from a monitored user device, a plurality of credentials, the credentials used to access a plurality of data from at least one messaging service account associated to the monitored user device; generating an asymmetric encryption key for the monitored user device to ensure security of the plurality of data; retrieving a list of user profiles associated to the monitored user device, each user profile of the list corresponding to a conversation with the monitored user device; providing the option to select from the list of user profiles which user profiles may be recorded; receiving from the monitored device at least one user profile, of the list of user profiles, to be recorded and stored; periodically retrieve a plurality of conversation data from the at least one messaging service to record and store, the plurality of conversation data associated to the at least one user profile; and record and store the conversation data.

According to an aspect of an embodiment, the conversation data is indexed for searching.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
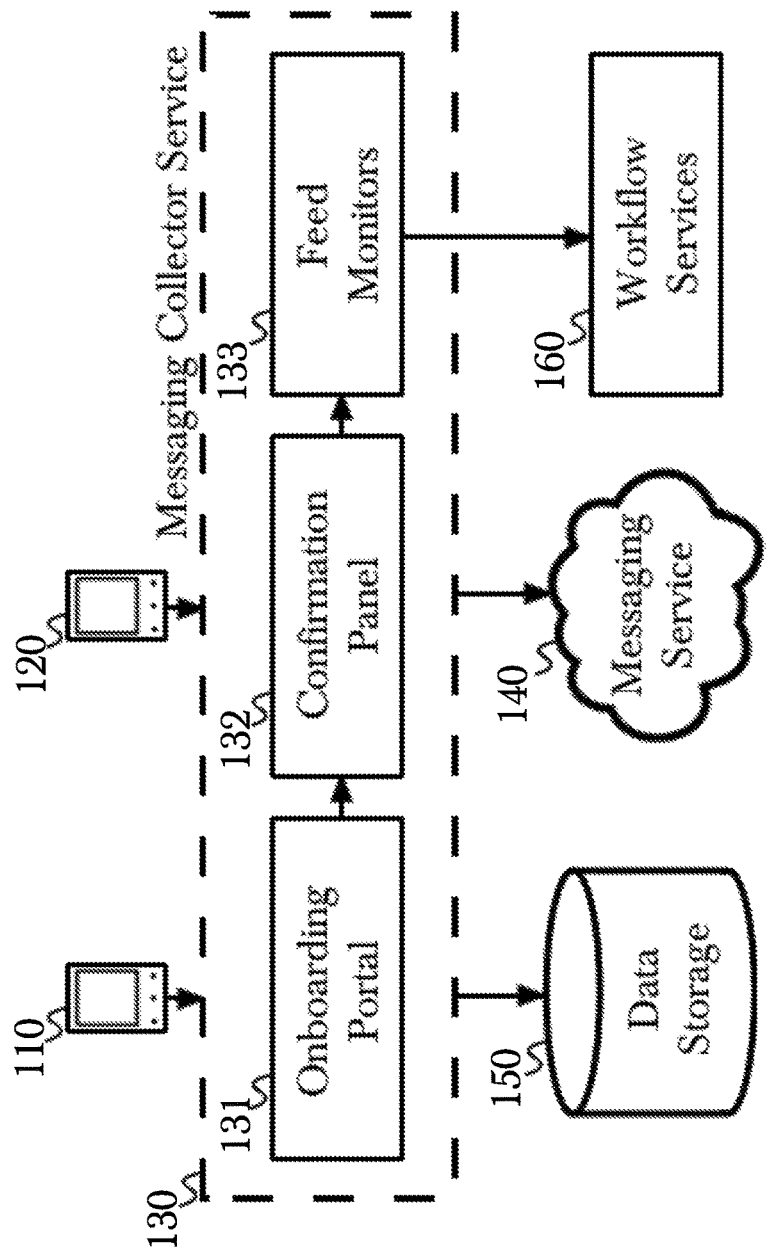
FIG. 1 is a system diagram illustrating the connections between components involved in the function of a messaging collector service.

The inventor has conceived, and reduced to practice, a system for automated recording and storage of messaging service conversations.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "administrative user" as used herein means the user profile of any person or entity that arranges for monitoring of a monitored user. In one embodiment, the administrative user may be a compliance officer of a company wishing to record employee work conversations to comply with regulatory rules.

The term "conversation" as used herein means at least one message sent through a messaging service between at least two persons. Typically, a conversation will comprise a series of messages back and forth between at least two persons The terms "credential" or "credentialing system" as used herein mean the use of some form of digital identification to ensure that the person using the system is authorized to use the system. In one embodiment, the credentialing system comprises a QR code displayed to an employee after the employee enters his or her name into the onboarding portal. The employee scans the QR code using his or her mobile phone, which has been previously listed by the employer as a device owned or used by that employee, and the mobile phone sends a confirmation code to the onboarding portal, allowing the employee access to the portal.

The term "message" as used herein means a discrete communication sent through a messaging service containing text, or images, or audio, or video, or any combination thereof.

The term "messaging service" as used herein means any service by which at least two parties may engage in conversations in the form of messages. Some popular messaging services currently in use include WhatsApp, Apple Messages, SnapChat, and Google Hangouts.

The term "monitored user" as used herein means the user profile of any person or entity that is monitored for recording by the system. In one embodiment, the monitored user may be an employee of a company whose conversations are required to be recorded by regulatory rules, such as in the financial industry.

The term "user profile" means any profile, account, or registration on a computer, computer system, network, website, or other system associated with a particular user.

Conceptual Architecture

FIG. 1 is a system diagram illustrating the connections between components involved in the function of a messaging collector service. Personal devices 110 such as personal phones, PDA's, tablets, and similar, as well as company devices 120 which may be the same sorts of devices but registered for corporate use, connect to a messaging collector service 130, containing subcomponents consisting of an onboarding portal 131 for managing new user sessions, a confirmation panel 132 to confirm user logins and settings, and feed monitor components 133 to monitor user messages once logged in. A data storage 150 for recording and storing unencrypted message content is connected to a messaging collector service 130, as is a messaging service 940 which may be connected also to personal or corporate devices 110, 120, for managing and monitoring. Conversation data stored in data storage 150 may be indexed and cataloged to facilitate searching. Workflow services 160, are connected to a feed monitor 133, which provides services to optimize workflow messaging such as automated scheduling services provided based on a parsing of user messages. A message service 140 may be SMS text messaging, SKYPE™ messaging, or other forms of text communication common to computer devices.

Figure 2:
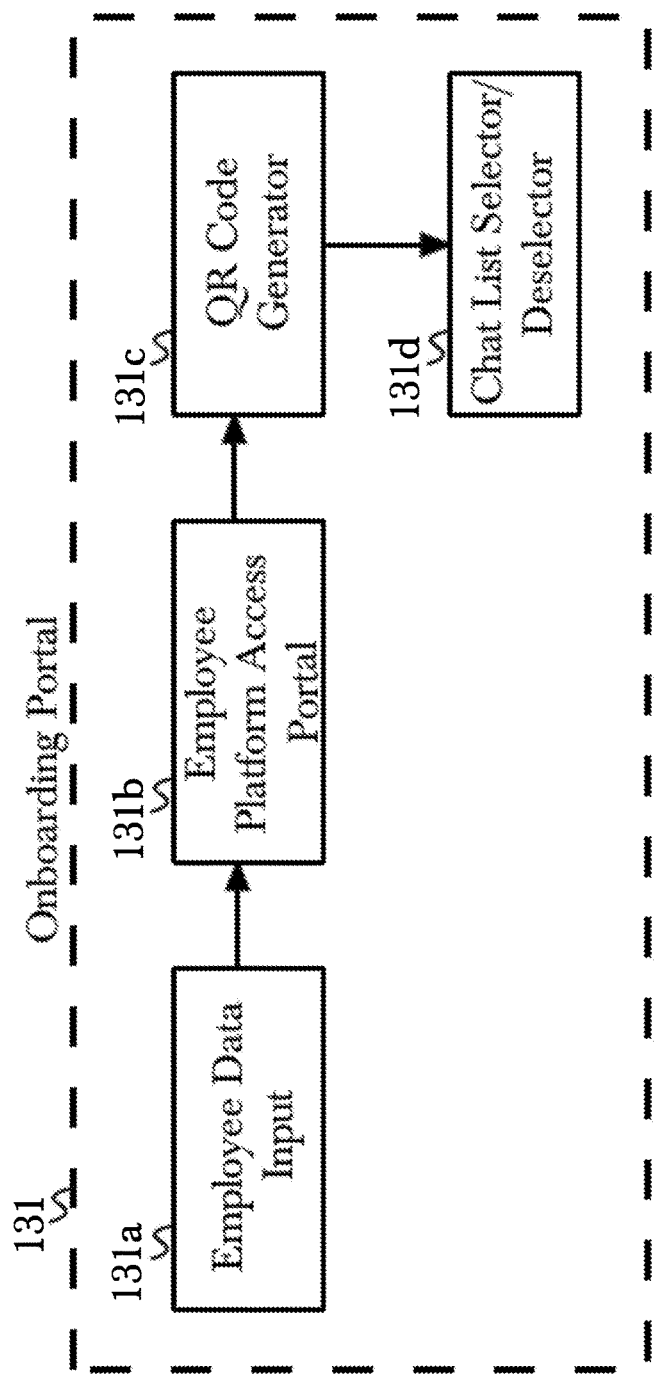
FIG. 2 is a system diagram illustrating the connections between subcomponents in an onboarding portal, according to a preferred aspect.

FIG. 2 is a system diagram illustrating the connections between subcomponents in an onboarding portal 131, according to a preferred aspect. Employee data input 131a is provided upon creation of a new user session via an onboarding portal 131, where a user may enter data such as employer ID, name, job title, and other dynamic information according to an aspect. An employee platform access portal 131b provides an opportunity for employees to log into any tertiary services including integration tools for applications on a client device 110, 120. A QR code generator 131c may generate QR codes with which to use in other applications on a client device 110, 120 for integration and additional functionality. A chat list selector and de-selector 131d exists to select or deselect chat applications and channels from a list of integrated chat applications or channels, for the purpose of enabling selective integration.

Figure 3:
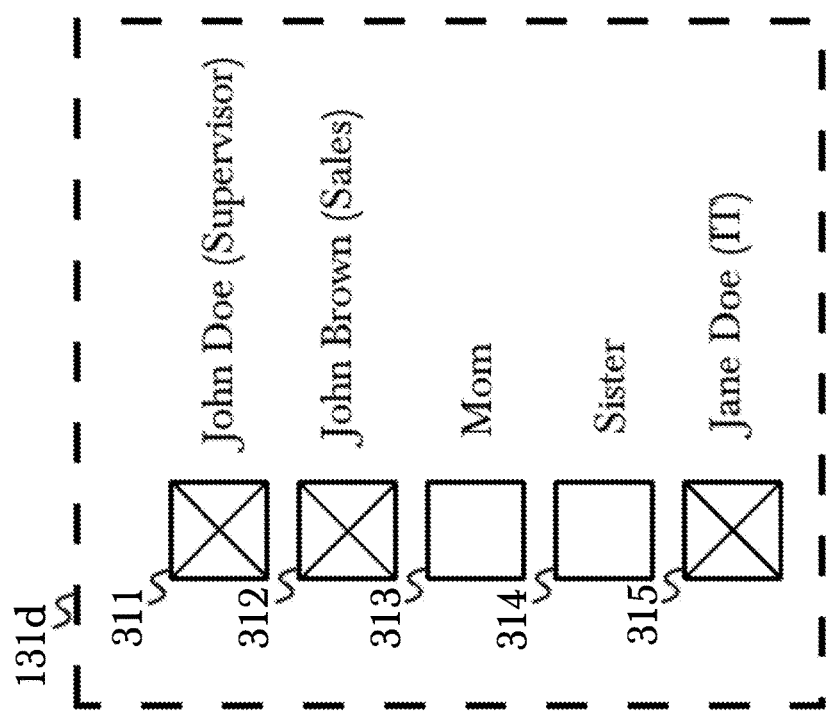
FIG. 3 is a block diagram illustrating an exemplary selection of possible chat messaging application selections and de-selections to preserve user privacy, according to an aspect.

FIG. 3 is a block diagram illustrating an exemplary selection of possible chat messaging application selections and de-selections to preserve user privacy, according to an aspect. An exemplary chat list selector/deselector 131d is shown, containing numerous checkboxes for a user to select from, to allow employees privacy in personal communications un-related to work. For example, an employee's supervisor 311, sales coworker 312, and coworker in the IT department 315 are selected to be monitored, meaning communications between them on common chat applications and across social media may be monitored by the employer. However, communications between the employee and his mother 313, and sister 314, are not monitored, to allow the employee privacy when speaking to individuals not related to the company and when speaking to people that an employee may expect utmost privacy regarding, in order to retain faith and good-will with his employer.

DETAILED DESCRIPTION OF EXEMPLARY ASPECTS

Figure 4:
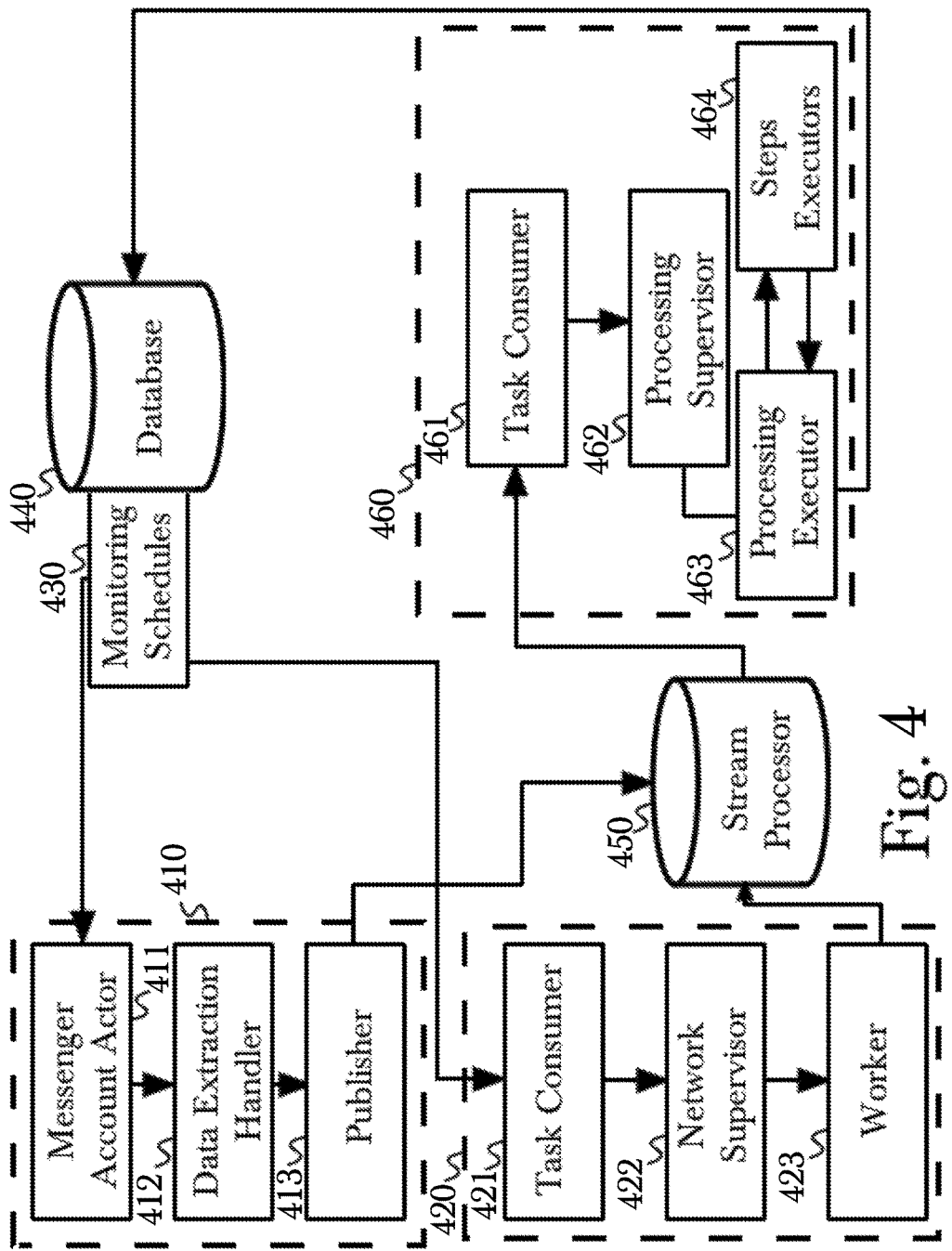
FIG. 4 is a block diagram illustrating interactions between several components of the system, according to an aspect of an embodiment.

FIG. 4 is a block diagram illustrating interactions between several components of the system, according to an aspect of an embodiment. Messenger services 410 include a messenger account actor 411, which may access a messenger service using permissions granted by a monitored user profile. A data extraction handler 412 may obtain communications from the monitored user profile after access is obtained. When relevant data is extracted, it may be published by a publisher component 413 to a stream processor 450 such as APACHE KAFKA™. Messenger service actor 411 may operate according to schedules 430 contained in a database 440, the monitoring schedules 430 also governing the consumption of data as a task consumer 421 in a data mining module 420. A data mining module 420 operates on a schedule determined by scheduling data 430 as stored in a database 440, using a task consumer 421 to regularly consume and process data from social media platforms and accounts as opposed to chat messenger applications which may be consumed by messenger services 410. A task consumer may 421 regularly and on a schedule 430 execute tasks using a network supervisor 422, before sending the requisite task processing to a worker 423. When a task is complete and raw data from a social media account or data mining operation is gathered, raw data is sent to a stream processor 450 which may be a software suite such as APACHE KAFKA™ or some other appropriate stream processor 450 software component, which applies operations to each segment of a stream of data, as specified by the software configuration. With data output from messenger services 410 using a publisher 413, and data output from data mining services 420 using a worker 423, to a stream processor 450, data which is processed by the stream processor 450 is sent to a second task consumer 461 which is a component in a data processing engine 460. After a second task consumer 461 organizes and executes tasks for processing data further, a processing supervisor 462 may decide steps or organization for processing different pieces of data with a task, or between tasks, before sending the data to be processed in this manner by a processing executor 463. A steps executor 464 communicates bi-directionally with a processing executor 463 to determine if changes in the order of data processing execution will be made, based on the outcome of processing execution 463 as it occurs. After data is processed it may be sent to a database 440 for storage, the data being the fully processed stream data from messenger services 410 and social media processing from a data mining engine 420.

Figure 5:
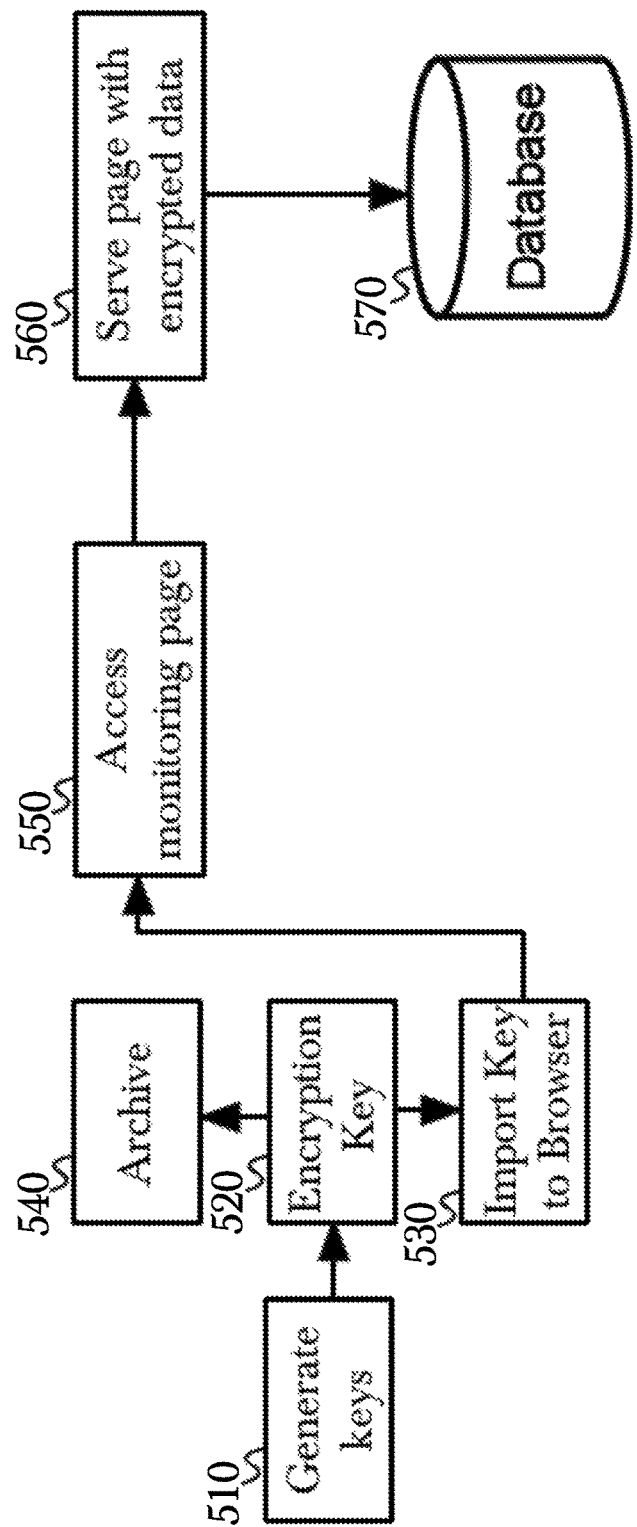
FIG. 5 is a block diagram illustrating the functionality of an asymmetric encryption option for protection of data in the system.

FIG. 5 is a block diagram illustrating the functionality of an asymmetric encryption option for protection of data in the system. This encryption is associated with the recording system itself, and is not associated with any encryption of messages which occurs at the messaging service. First, encryption keys 520 are generated 510, which may be based on 256-bit encryption, for high-security encryption which is resistant to brute-force cracking efforts. An encryption key 520 may then be imported into a web browser 530, in order for a user to access encrypted services such as an onboarding portal 131 or to access the monitoring page 550 for monitoring messenger and social media activity of employees. A simultaneous step in an asymmetric encryption option for users is to archive the keys 540. After a key is imported into a browser 530 so that a monitoring service may be accessed securely 550, the page may be served with encrypted data 560 allowing a user to view this encrypted data with their key, and ensuring it is not viewable to unauthorized parties, before storing it in a database 570 for record-keeping purposes.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
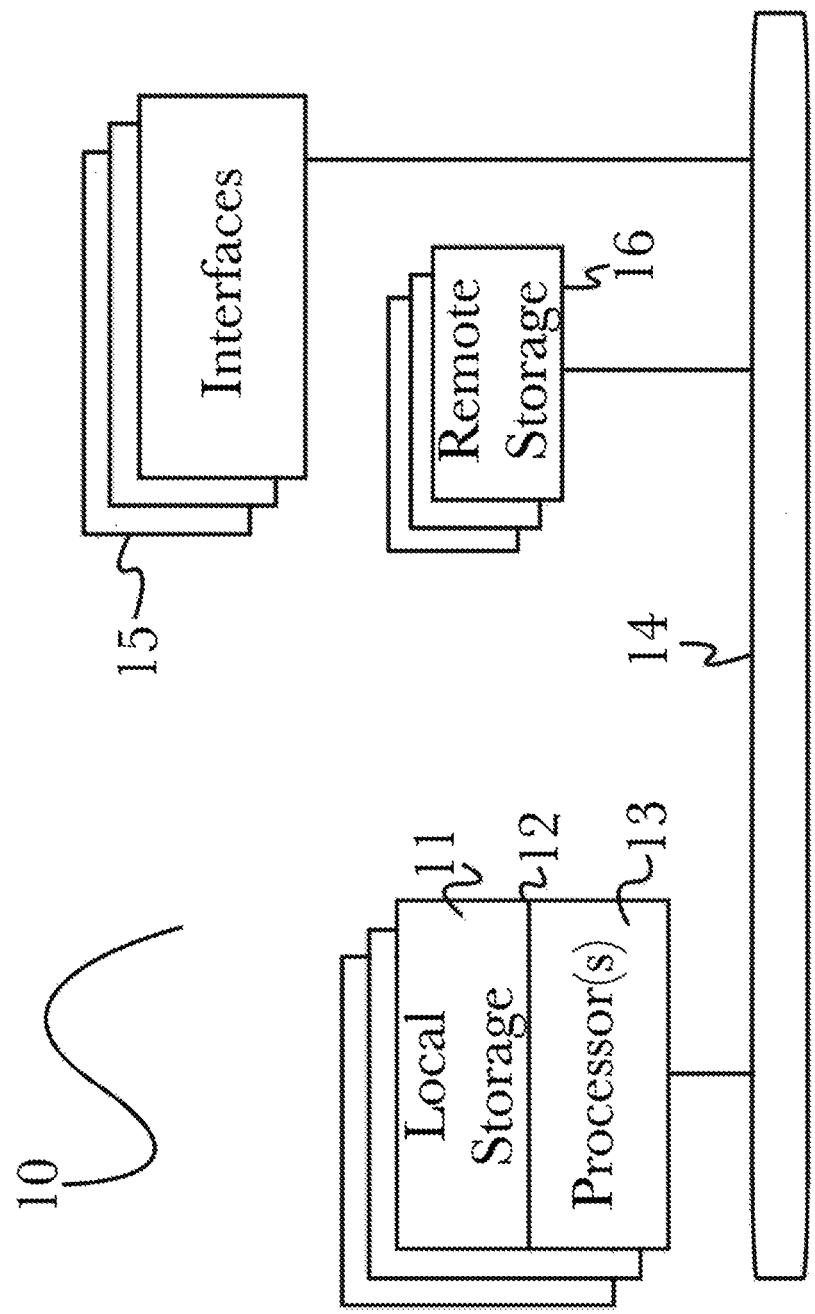
FIG. 6 is a block diagram illustrating an exemplary hardware architecture of a computing device.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
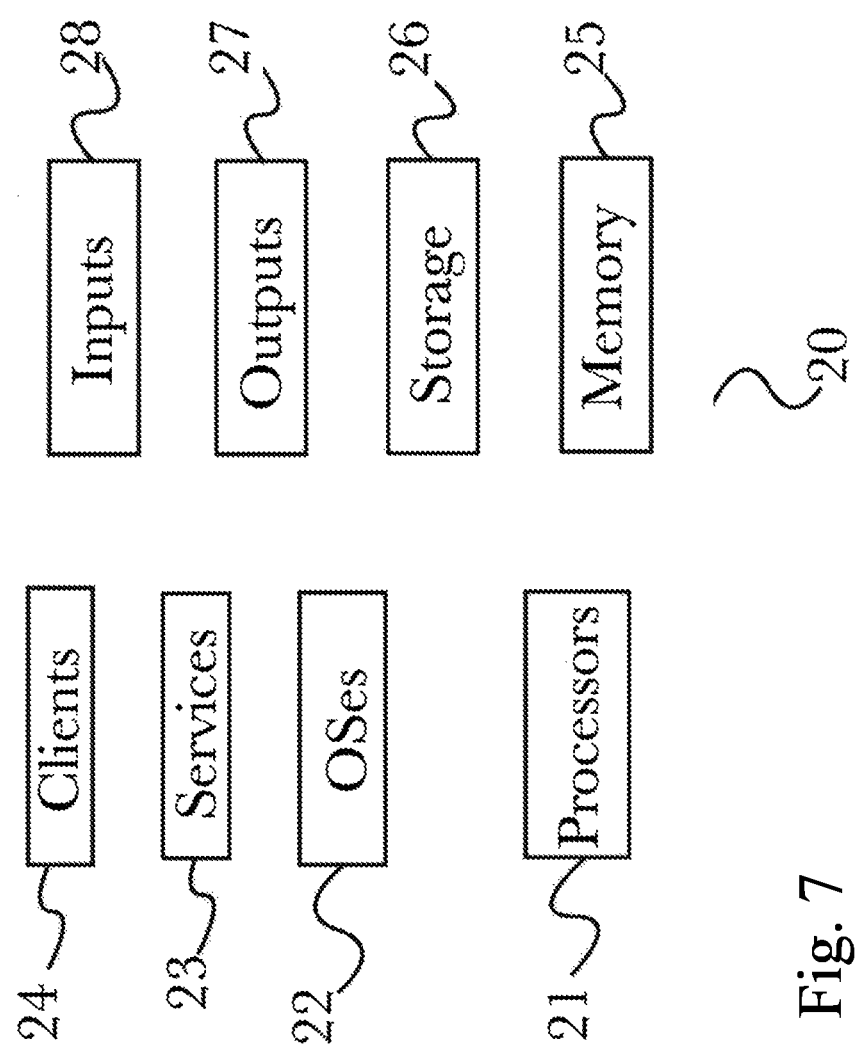
FIG. 7 is a block diagram illustrating an exemplary logical architecture for a client device.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
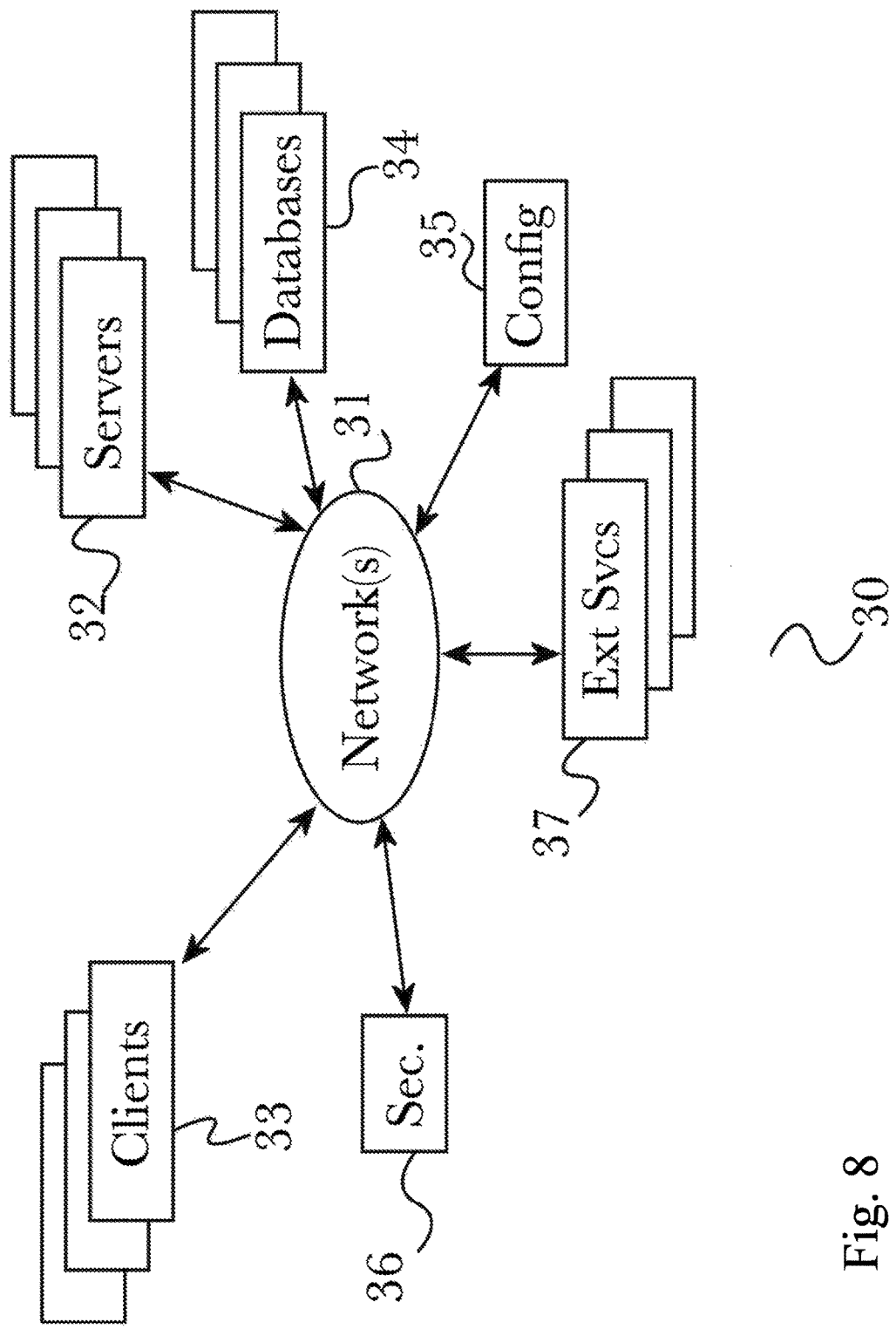
FIG. 8 is a block diagram showing an exemplary architectural arrangement of clients, servers, and external services.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
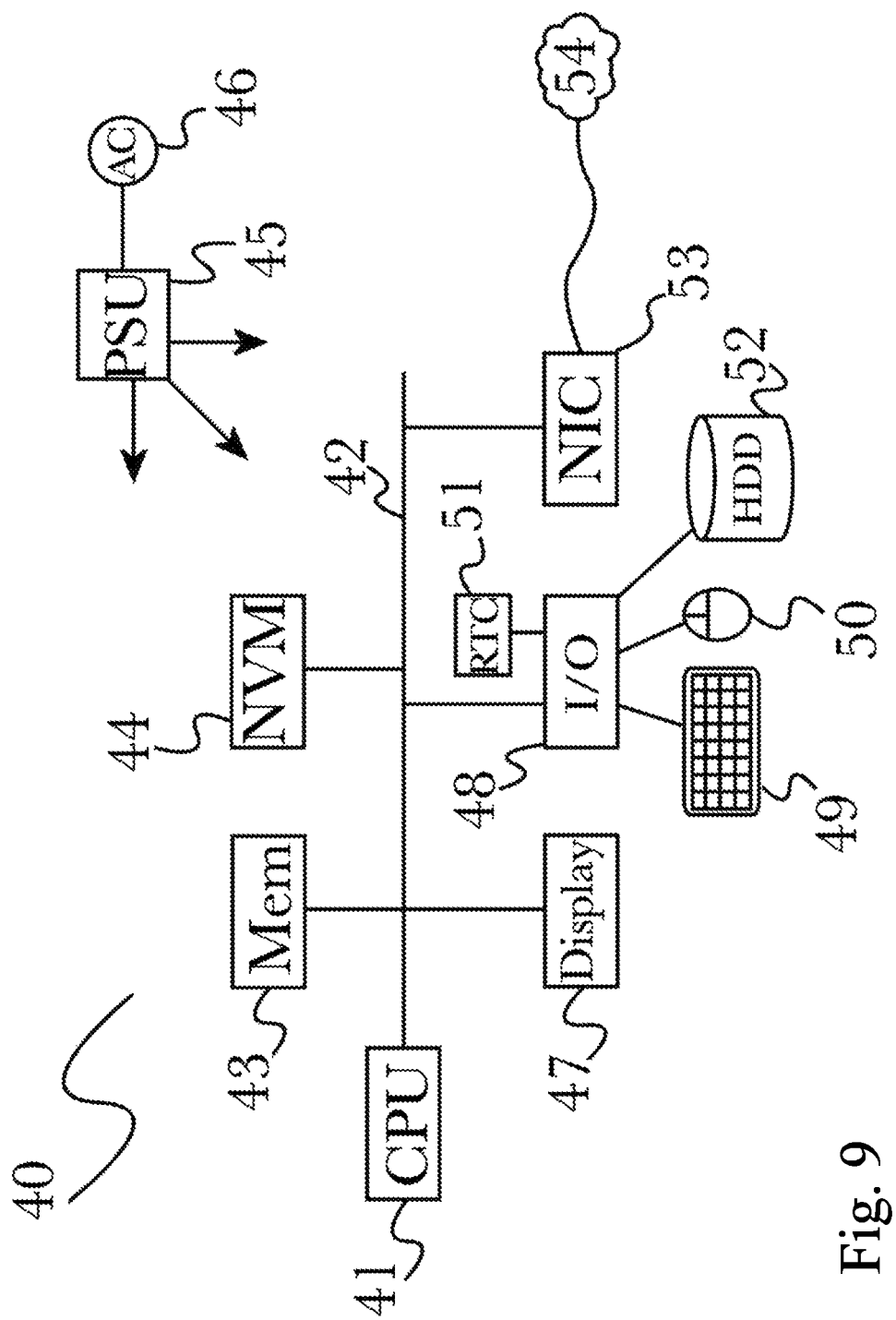
FIG. 9 is another block diagram illustrating an exemplary hardware architecture of a computing device.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated recording of conversations on messaging services, comprising:
a computer comprising a memory, at least one processor, and a plurality of programming instructions stored in the memory, the plurality of programming instructions when executed by the processor, cause the processor to:
receive, from a monitored user device, a plurality of credentials, the credentials used to access a plurality of data in unencrypted form from at least one messaging service account associated to the monitored user device;
generate an asymmetric encryption key for the monitored user device to ensure security of the plurality of data;
retrieve a list of user profiles associated with the monitored user device, each user profile of the list corresponding to at least one conversation with the monitored user device;
provide the option to select from the list of user profiles which user profiles may be recorded;
receive from the monitored device at least one user profile, of the list of user profiles, to be recorded and stored;
periodically retrieve a plurality of conversation data from the at least one messaging service to record and store, the plurality of conversation data associated with the at least one user profile;
and record and store the plurality of conversation data.

2. The system of claim 1, wherein the conversation data is indexed for searching.

3. A messaging service conversation recording computer comprising a memory, at least one processor, and a plurality of programming instructions stored in the memory, the plurality of programming instructions when executed by the processor, cause the processor to perform a method for automated recording of conversations on messaging services, comprising the steps of:
receiving, from a monitored user device, a plurality of credentials, the credentials used to access a plurality of data from at least one messaging service account associated to the monitored user device;
generating an asymmetric encryption key for the monitored user device to ensure security of the plurality of data;
retrieving a list of user profiles associated to the monitored user device, each user profile of the list corresponding to a conversation with the monitored user device;

providing the option to select from the list of user profiles which user profiles may be recorded;

receiving from the monitored device at least one user profile, of the list of user profiles, to be recorded and stored;

periodically retrieve a plurality of conversation data from the at least one messaging service to record and store, the plurality of conversation data associated to the at least one user profile; and record and store the conversation data.

4. The method of claim 3, wherein the conversation data is indexed for searching.

* * * * *